United States Patent [19]
Baechler et al.

[11] Patent Number: 5,476,275
[45] Date of Patent: Dec. 19, 1995

[54] BABY STROLLER WITH REMOVABLE WHEELS

[75] Inventors: Philip A. Baechler; Matthew Eichenberger; William J. Setter, all of Yakima; Bruce A. Sully, Everett, all of Wash.

[73] Assignee: Racing Strollers, Inc., Yakima, Wash.

[21] Appl. No.: 122,225

[22] Filed: Sep. 15, 1993

Related U.S. Application Data

[63] Continuation-in-part of Ser. No. 948,913, Sep. 18, 1992, Pat. No. Des. 343,812.

[51] Int. Cl.⁶ .................................................. B62B 9/12
[52] U.S. Cl. .................... 280/47.38; 280/62; 301/111; 301/121
[58] Field of Search .......................... 280/62, 47.38, 280/642, 650, DIG. 6; 301/111, 113, 120, 121

[56] References Cited

U.S. PATENT DOCUMENTS

| | | | |
|---|---|---|---|
| Re. 3,636 | 9/1869 | Christian . | |
| D. 204,254 | 4/1966 | Cerf | D14/14 |
| D. 297,525 | 9/1988 | Baechler | D12/129 |
| D. 315,885 | 4/1991 | Jacobs | D12/129 |
| 353,218 | 11/1886 | Harrington | 301/120 |
| 699,186 | 5/1902 | Katzke . | |
| 2,425,688 | 8/1947 | Schulte | 280/36 |
| 3,781,031 | 12/1973 | Patin | 280/62 |
| 3,870,371 | 3/1975 | Solomon | 301/1 |
| 4,346,912 | 8/1982 | Habib | 280/644 |
| 4,550,930 | 11/1985 | Proffit | 280/DIG. 6 X |
| 4,570,956 | 2/1986 | Dyer | 280/30 |
| 4,618,184 | 10/1986 | Harvey | 297/19 |
| 4,765,646 | 8/1988 | Cheng | 301/113 X |
| 4,847,945 | 7/1989 | Schwartz et al. | 16/30 |
| 4,917,442 | 4/1990 | Johnson | 301/113 |
| 4,953,880 | 9/1990 | Sudakoff et al. | 280/47.38 |
| 4,958,842 | 9/1990 | Chang | 280/7.1 |
| 4,963,115 | 10/1990 | Davin et al. | 446/96 |
| 5,029,891 | 7/1991 | Jacobs | 280/650 |
| 5,123,670 | 6/1992 | Chen | 280/650 |
| 5,188,389 | 2/1993 | Baechler et al. | 280/650 |
| 5,215,356 | 6/1993 | Lin | 280/47.38 X |

FOREIGN PATENT DOCUMENTS

| | | | |
|---|---|---|---|
| 0064368 | 11/1982 | European Pat. Off. | 280/47.38 |
| 1228268 | 4/1960 | France | 301/121 |
| 3811757 | 10/1989 | Germany | 301/111 |
| 186812 | 7/1992 | Taiwan . | |
| 888794 | 2/1962 | United Kingdom | 301/121 |

OTHER PUBLICATIONS

"Runabouts", The fun carts that Grow with your family, Feb. 1994.

*Primary Examiner*—Brian L. Johnson
*Attorney, Agent, or Firm*—Seed and Berry

[57] ABSTRACT

An all terrain baby stroller using an axle assembly that allows the rear wheels to be easily and quickly mounted and removed from the stroller frame without tools. The axle assembly has each rear wheel rotatably mounted on an outward end portion of a stub axle. A tubular rear axle defines a cylindrical interior chamber with an outward end opening sized to slidably receive the stub axle inward end portion therethrough for positioning of the stub axle inward portion coaxially within the interior chamber. When so positioned, a circumferential groove of the stub axle inward end portion is positioned within the interior chamber. The tubular sidewall of the rear axle has an aperture positioned axially inward from the interior chamber outward opening and at a location to coincide with the circumferential groove. A lock pin is carried by a strip spring and is movably disposed in the sidewall aperture for selective movement between an engagement position and a disengagement position. In the engagement position the pin extends into the interior chamber and into the circumferential groove of the stub axle inward end portion to prevent axial withdrawal of the stub axle from the interior chamber. When in the disengagement position, the pin is sufficiently clear of the circumferential groove to permit the stub axle inward end portion to be axially inserted into and removed from the interior chamber.

16 Claims, 3 Drawing Sheets

BABY STROLLER WITH REMOVABLE WHEELS

CROSS-REFERENCE TO RELATED APPLICATION

This application is a continuation-in-part of U.S. application Ser. No. 07/948,913, filed Sep. 18, 1992, now issued as U.S. Pat. No. Des. 343,812.

TECHNICAL FIELD

The present invention relates to baby strollers, and more particularly, to all-terrain baby strollers that can be collapsed and their rear wheels removed.

BACKGROUND OF THE INVENTION

Traditionally, baby strollers have been used to push an infant slowly on a relatively hard, smooth floor or sidewalk. As a result, the strollers were made small and light. These strollers work well enough at slow speed, but are extremely unwieldy and even dangerous on rough surfaces or at higher speeds.

As parents have become more health conscious in recent times, jogging and fast walking has become a popular pastime. Because baby strollers were not designed to be operated at high speed or on rough terrain, parents could jog or walk fast only when another person was available to babysit. As any parent knows, it is not always easy to find babysitters, so the ability of the parent to stay in shape by jogging or fast walking was severely limited.

Even for non-jogging parents, the need for an improved baby stroller has been apparent. The small, plastic wheels customarily used for the baby strollers are almost useless when it is desired to walk with an infant in a grassy park or on a rough road or sidewalk. Parents end up not walking with the infant at all or only walking in limited areas.

All-terrain baby strollers have been designed to overcome these problems. These strollers typically employ much larger wheels, often large bicycle tires. The stroller frame and frame connections are constructed to be stronger and larger to handle the heavy duty use they may receive. It is now quite common to see a parent pushing an infant while jogging fast-walking or even just slow walking in grassy, bumpy areas or over other rough terrain.

These new strollers have their drawbacks. The increased size and durable construction make the stroller much larger and heavier than in the past, and as a result much more difficult to transport, especially as car sizes have decreased. Not everyone has access to large vehicles or to tools to take the stroller apart for transport. Even if tools were available, it is not practical or convenient to take the time needed to dismantle the stroller each time it is to be transported. Further, the larger size of all-terrain strollers makes their storage difficult.

The present invention solves the problems by providing a quick, easy way to remove the rear wheels of an all-terrain stroller.

SUMMARY OF THE INVENTION

The present invention resides in a portable baby stroller and an axle assembly therefor. The axle assembly includes a stub axle having an outward end portion with a rear wheel rotatably mounted thereon and an inward end portion having a circumferential groove therein. The axle assembly further includes a rear axle having a circumferential sidewall defining therewithin an axially extending interior chamber with an outward facing opening sized to receive the stub axle inward end portion therethrough for position of the stub axle inward end portion coaxially within the interior chamber with the circumferential groove located axially inward of the interior chamber opening. The sidewall has an aperture therein positioned axially inward from the interior chamber outward opening and at a location to coincide with the circumferential groove when the stub axle inward end portion is within the interior chamber.

The axle assembly also includes a lock member movably disposed in the sidewall aperture and selectively movable between an engagement position and a disengagement position. In the engagement position, the lock member extends into the interior chamber and into the circumferential groove of the stub axle inward end portion when positioned in the interior chamber to prevent axial withdrawal of the stub axle inward end portion from the interior chamber. When in the disengagement position, the lock member is sufficiently clear of the circumferential groove of the stub axle inward end portion to permit the stub axle inward end portion to be axially inserted into and removed from the interior chamber.

The axle assembly has a biasing member biasing the lock member to move into the engagement position and holding the lock member in the engagement position when the stub axle inward end portion is within the interior chamber. The biasing member is movable to permit the lock member to be selectively moved to the disengagement position. The stub axle inward end portion has an inwardly tapered end to engage the lock member upon insertion of the stub axle inward end portion into the interior chamber and push the lock member in an outwardly direction through the sidewall aperture sufficient to permit the stub axle inward end portion to be moved into the interior chamber until the circumferential groove is aligned with the lock member. When in this position, the biasing member moves the lock member inward into the circumferential groove.

In a preferred embodiment, the biasing member is a spring and the lock member is a pin. The pin is attached to the spring and the spring resiliently holds the pin in the engagement position. The spring has sufficient flexibility to yield under a force manually applied by a user and carries the pin therewith to the disengagement position.

The axle assembly is usable with a baby stroller having an upright frame member attached to the rear axle and extending upwardly therefrom. The spring is a flat strip spring having a first end spring portion attached to a forward facing portion of the upright member and a second end spring portion attached to a rearward facing portion of the upright member with a midportion extending between the first and second end spring portions. The pin is attached to one of the first and second end spring portions for movement therewith and the spring midportion extends below the rear axle.

In the illustrated embodiment, the rear axle is a tube and the sidewall is cylindrical to form the interior chamber with a longitudinally extending, cylindrical shape. The stub axle inward end portion has a circular cross-section sized to slidably fit within the cylindrical chamber. The circumferential groove of the stub axle inward end portion extends fully about the circumference of the stub axle inward end portion.

In the illustrated embodiment, the rear axle includes an inner first tube forming the cylindrical interior chamber and an outer second tube which snugly receives the inner tube therein. The first and second tubes are fixedly attached together with the first and second tubes each having a sidewall aperture aligned with the other so as to together form the sidewall aperture with the lock member movable therethrough.

Other features and advantages of the invention will become apparent from the following detailed description, taken in conjunction with the accompanying drawings.

DETAILED DESCRIPTION OF THE INVENTION

Figure 1:
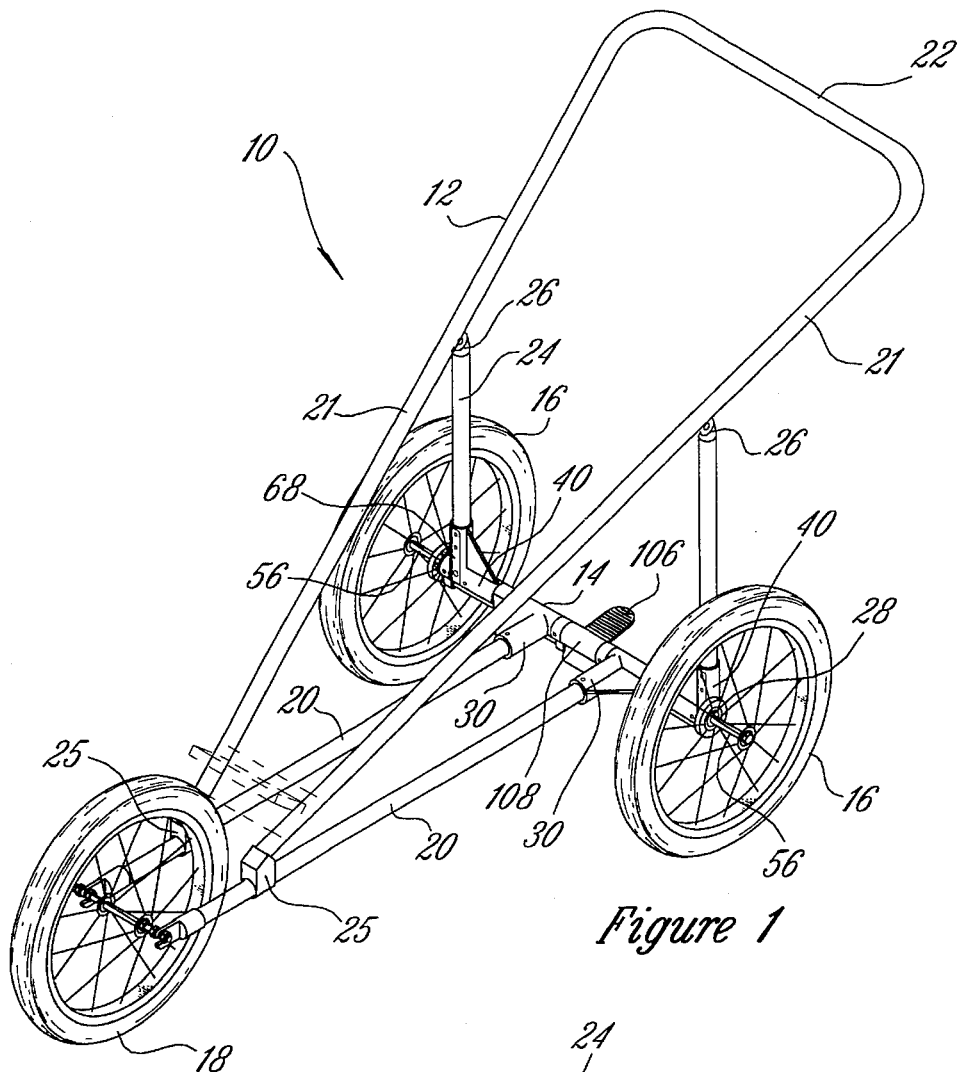
FIG. 1 is an isometric view of a baby stroller embodying the present invention shown in an upright position for use, but without a seat being shown.

As shown in the drawings for purposes of illustration, the present invention is embodied in an all-terrain baby stroller 10 having a foldable frame 12 and a transversely extending rear axle assembly 14 designed to permit folding of the frame and selective removal of the two rear wheels 16 rotatably mounted to the rear axle assembly. The forward end of the frame 12 has a single front wheel 18 rotatably mounted thereto. The frame 12 includes left and right side horizontal base frame tubes 20 extending rearwardly from the front wheel 18 in parallel configuration to the rear axle assembly 14.

The frame 12 also includes left and right, downwardly sloping upper frame tubes 21 which extend from a handle 22 in converging configuration to the horizontal base frame tubes 20 at a position near the rearwardmost extent of the front wheel 18. The forward ends of the upper frame tube 21 are releasably coupled to the horizontal base frame tubes 20 by left and right frame connectors 25 to permit folding of the stroller 10. The handle 22 is positioned at a height convenient for a user to push the stroller 10.

The frame 12 further includes left and right upright support tubes 24 extending between the rear axle assembly 14 and the upper frame tubes 21 at a position below and forward of the handle 22. The upright support tubes 24 are pivotally connected to the upper frame tubes 21 by left and right pivot joints 26, and fixedly connected to the axle assembly 14 by couplers, as will be described below to permit folding of the stroller 10 when the frame connectors 25 are released to free the forward ends of the upper frame tubes from the horizontal base frame tubes 20.

Figure 2A:
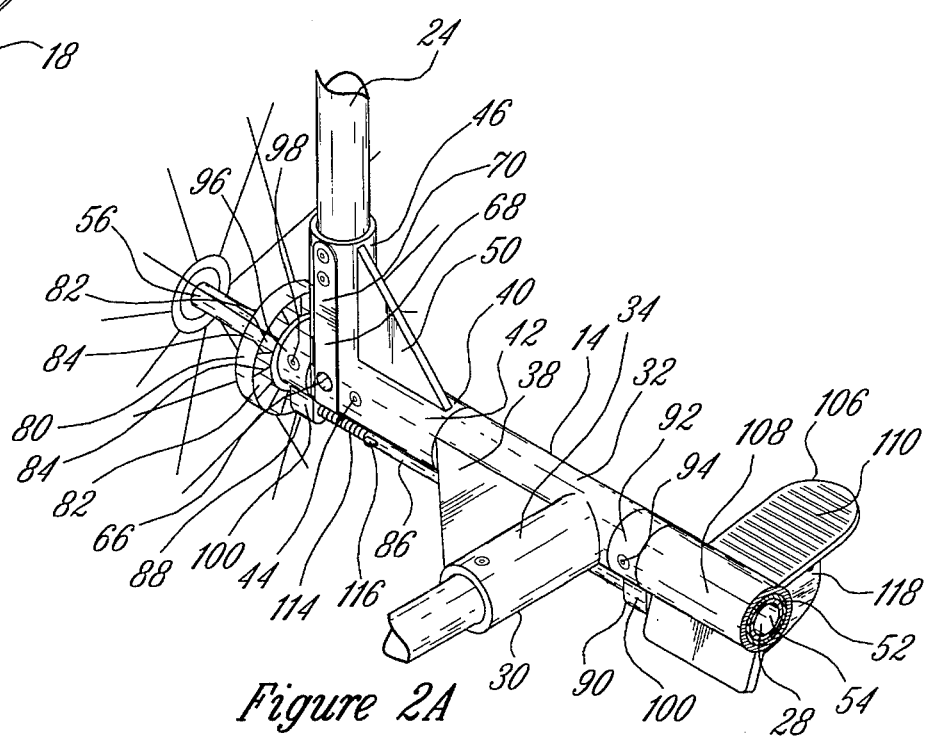
FIG. 2A is an enlarged, fragmentary, isometric view of the right side of the axle assembly of FIG. 1 with the right rear wheel attached to the rear axle.
Figure 2B:
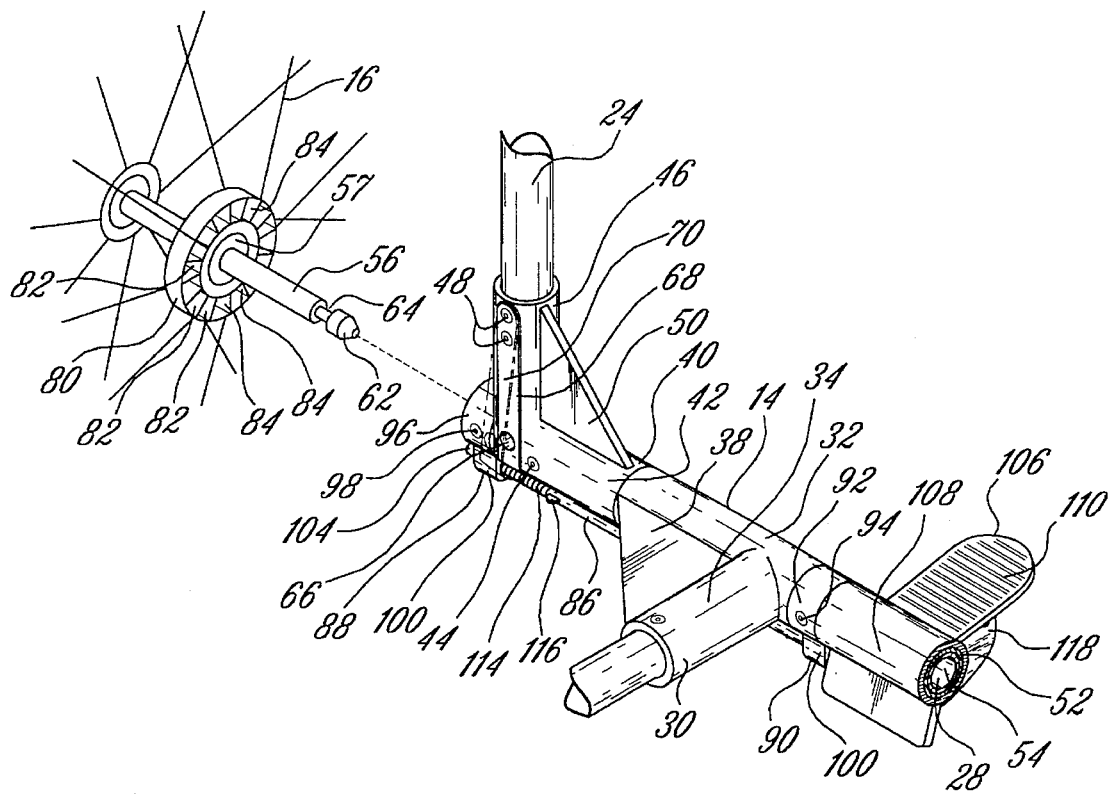
FIG. 2B is an enlarged fragmentary, isometric view of the right side of the axle assembly of FIG. 1 shown with the right rear wheel shown removed from the rear axle.

As best shown in FIGS. 2A and 2B, the rear axle assembly 14 uses a non-rotating tubular rear axle 28. Each of the horizontal base frame tubes 20 is coupled to the rear axle 28 by a first coupler 30 with a tubular connector portion 32 rotatably receiving the rear axle 28 therethrough to permit rotation of the horizontal base frame tubes relative to the rear axle upon folding of the frame 12 for storage or transport. The first coupler 30 also has a frame tube receiver portion 34 within which a corresponding one of the left or right horizontal base frame tubes 20 is inserted and fixed in place using rivets 36. A gusset 38 is fixedly attached to both the tubular connector portion 32 and the frame tube receiver portion 34 of each first coupler 30 to rigidly hold them together.

Each of the upright support tubes 24 is coupled to the rear axle 28 by a second coupler 40 with a tubular connector portion 42 receiving the rear axle 28 therein. The tubular connector portion 42 and the rear axle 28 are fixedly attached together by rivets 44. The second coupler 40 also has a frame tube receiver portion 46 within which a corresponding one of the left or right upright support tubes 24 is inserted and fixed in place using rivets 48. A gusset 50 is fixedly attached to both the tubular connector portion 42 and the frame tube receiver portion 46 of each second coupler 40 to rigidly hold them together. As a result, the upright support tubes 24 and the rear axle 28 are fixed together and rotate as a unit when the frame 12 is folded for storage. With this arrangement, the first coupler 30, which holds one of the horizontal base frame tubes 20, and the second coupler 40, which holds one of the upright support tubes 24, can be freely rotated relative to each other by a sufficient amount to allow the folding of the upright support tubes downward relative to the horizontal base frame tubes for folding of the stroller 10.

Figure 4A:
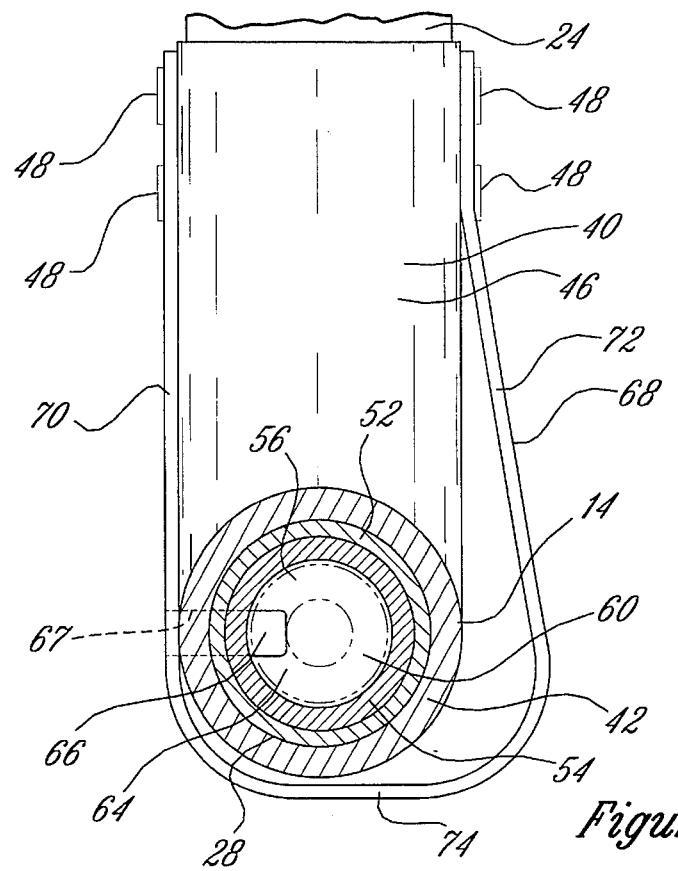
FIG. 4A is an enlarged, cross-sectional, left side elevational view of the lock mechanism of the axle assembly of FIG. 1 shown in an engaged position to lock the stub axle in position within the rear axle tube.
Figure 4B:
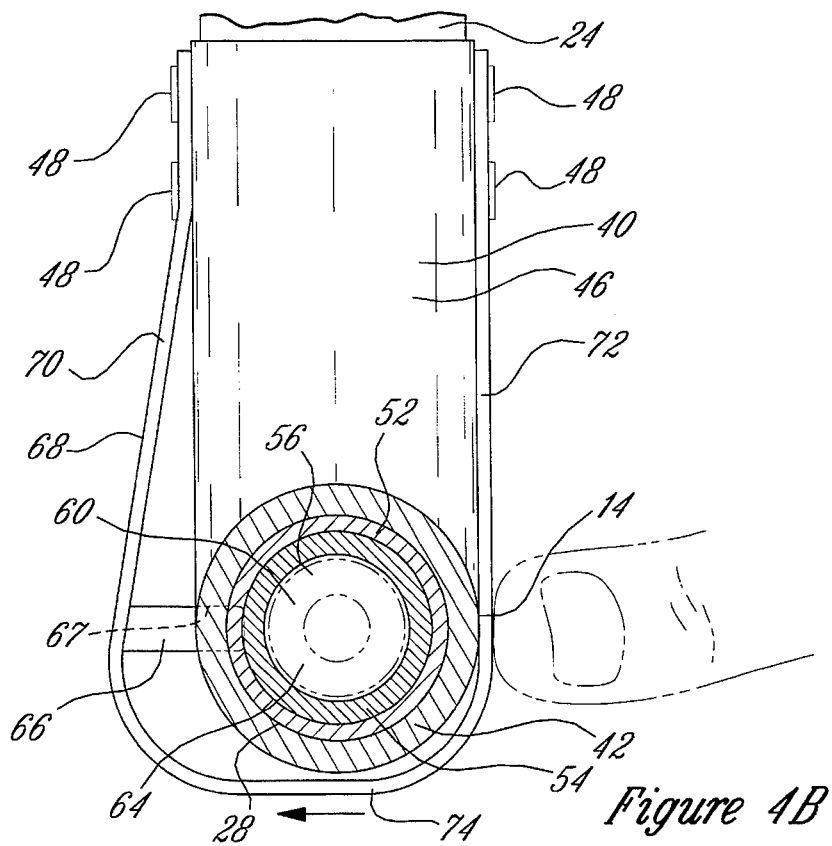
FIG. 4B is a cross-sectional, left-side view of the stroller of the lock mechanism as shown in FIG. 4A in a disengaged position to release the stub axle for removal from the rear axle tube.

As best seen in FIGS. 4A and 4B, the rear axle 28 includes an outer metal tube 52 and a thicker walled inner metal tube 54 snugly positioned coaxially within the outer axle tube 52. The outer and inner axle tubes 52 and 54 are fixedly connected together by the rivets 44 which also serve to fixedly attach the tubular connector portion 42 to the rear axle 28 described above. The inner axle tube 54 is open at both its left and right ends, and has a uniform interior diameter along its full length.

Figure 3:
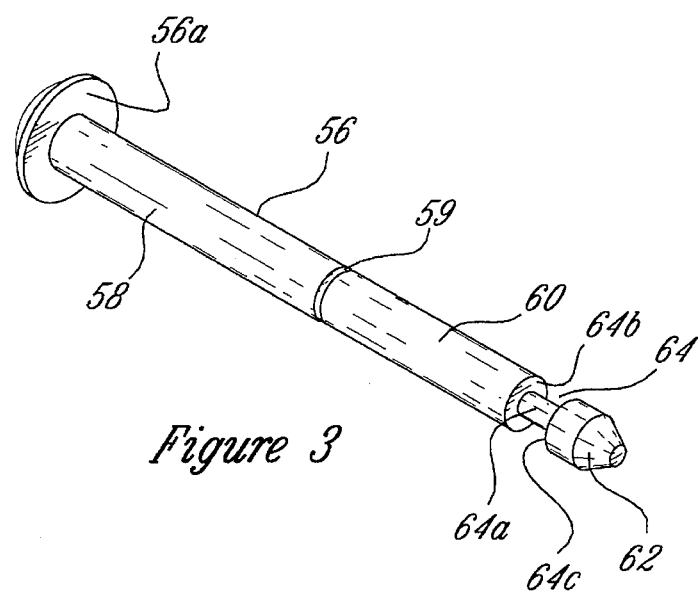
FIG. 3 is an enlarged isometric view of a stub axle used for the stroller of FIG. 1.

Referring again to FIGS. 2A and 2B, and to FIG. 3, the rear axle assembly 14 further includes left and right spindles or stub axles 56 having a circular cross-section. Each of the rear wheels 16 of the stroller 10 is rotatably mounted on an outer end portion 58 of a corresponding one of the stub axles 56 using conventional bearings. The rear wheel 16 is rotatably retained between a retainer head portion 58a of the stub axle 56 at an end thereof and a retainer clip 57 positioned in a retainer clip groove 59 located between the outer end portion 58 and an inward end portion 60 of the stub axle 56. The inward end portion 60 of each stub axle 56 is sized to be inserted into and snugly retained within the corresponding left or right end of the inner axle tube 54. In the illustrated embodiment, the inward end portion 60 of both the left and right stub axles 56 have the same diameter round cross-section so that the user can conveniently interchange the left and right rear wheels and their stub axles on the left and right ends of the inner axle tube 54.

An inward end 62 of the inward end portion 60 of each of the left and right stub axles 56 has a circumferential bevel to form a tapered end to facilitate insertion into the corresponding left or right open ends of the inner axle tube 54 for attachment of the rear wheels 14 to the tubular axle 28. The inward end portion 60 of the stub axles 56 are sized to slide easily within the inner axle tube 54 once the user partially inserts them into the left and right open ends thereof using only a slight inward force applied by the hand of the user.

Similarly, the inward end portion 60 of the stub axles 56 easily slide out of the left and right ends of the inner axle tube 54 when it is desired that the rear wheels 14 be removed for storage or transport with or without folding of the stroller 10.

The inward end portion 60 of the left and right stub axles 56 are retained within the corresponding left and right ends of the inner axle tube 54 by left and right user-actuated, releasable lock mechanisms. Each of the releasable lock mechanisms includes a circumferential groove 64 formed on the inward end portion 60 of the stub axle 56 and a movable pin 66 which extends through an aperture 67 extending fully through forward-facing wall portions of the tubular connector portion 42 of the second coupler 40 and the outer and inner axle tubes 52 and 54 of the rear axle 28, and extends into the interior of the inner axle tube at the location aligned with the stub axle groove 64 when the inward end portion 60 is fully inserted into the end of the inner axle tube. The pin 66 has sufficient length when in an engagement position shown in FIG. 4A to project within the stub axle groove 64 and thereby prevent axial withdrawal of the stub axle 56 from within the inner axle tube 54.

The stub axle groove 64 extends fully about the circumference of the stub axle inward end portion 60. The stub axle groove 64 is defined by a bottom wall 64a formed coaxial and concentric with the circular exterior sidewall of the stub axle inward end portion 60 and a pair of axially spaced-apart sidewalls 64b and 64c extending radially out from the bottom wall at 90° thereto (when the stub axle is viewed in longitudinal cross-section).

The pin 66 is held in the engagement position by a flat strip spring 68. The spring 68 has a forward leg portion 70 fixedly attached to forward-facing wall portion of the frame tube receiver portion 46 of the second coupler 40 by a first pair of the rivets 48 and carrying the pin 66. In the illustrated embodiment, the pin 66 is formed integral with the forward spring leg portion 70. The spring 68 also has a rearward leg portion 72 fixedly attached to a rearward-facing wall portion of the frame tube receiver portion 46 of the second coupler 40 by a second pair of the rivets 48. The forward and rearward leg portions 70 and 72 of the spring 68 are connected together by a lower portion 74 which extends below the tubular connector portion 42 of the second coupler 40. The spring 68 is shaped and affixed to the tubular connector portion 42 of the second coupler 40 so that the forward leg portion 70 lays flat against the forward-facing wall portion of the tubular connector portion 42 and the rearward leg portion 72 is bowed away from the rearward-facing wall portion. This biases the pin 66 into the engagement position, but the rearward leg portion 72 is bowed sufficiently to permit sufficient forward movement of the forward leg portion 70 to move the pin 66 forward to the disengagement position shown in FIG. 4B whereat the pin does not interfere with the insertion or withdrawal of the inward end portion 60 of the stub axle 56 into or from the inner axle tube 54.

When inserting the inward end portion 60 of the stub axle 56 in the end of the inner axle tube 54 to attach one of the rear wheels 16 to the frame 12, the pin 66 will be first engaged by the tapered inward end 62 of the stub axle and pushed forward into the disengagement position to permit passage thereby of the inward end portion of the stub axle. When the inward end portion 60 of the stub axle 56 is fully inserted into the inner axle tube 54, the stub axle groove 64 is in alignment with the pin 66 and the spring 68 will automatically move the pin into the engagement position within the stub axle groove, thereby locking and holding the stub axle in position during use of the stroller 10. This provides a self-locking feature which does not require the user to do more than push on the stub axle to lock it in place within the inner axle tube.

The stub axle 56 is removed when it is desired to remove the rear wheel 16 from the frame 12 by the user simply pressing forward on the rearward leg portion 72 of the spring 68 to move the forward leg portion 70 and the attached pin 66 forward into the disengagement position whereat the pin is withdrawn from the stub axle groove 64. Then, the inward end portion 60 of the stub axle is easily removed from the inner axle tube 54 by the user pulling the stub axle clear of the inner axle tube. With the present invention, the rear wheels 16 can be quickly and easily removed and reattached to the frame 12 without tools.

The inward end portion 60 of the stub axle 56 has a circular cross-section and a circumferential stub axle groove 64 extending around the full circumference thereof so that the pin 66 will engage the groove regardless of the rotational orientation of the stub axle. Thus, the user can insert the inward end portion 60 of the stub axle 56 into the end of the inner axle tube 54 without regard for the rotational orientation of the stub axle and always achieve a secure locking of the stub axle within the inner axle tube.

As best shown in FIGS. 2A and 2B, each of the left and right rear wheels 16 includes a receiver 80 mounted coaxially on the stub axle 56 with the rear wheel and attached thereto for rotation with the rear wheel. The receiver 80 is positioned inward of the rear wheel between the rear wheel and the retainer clip 57. The receiver 80 has a plurality of uniformly sized receiver openings 82 which are arranged circumferentially about the stub axle 56 in concentric arrangement with the rear axle 28 when the rear wheel is attached to the rear axle. A plurality of radially extending ribs 84 define the receiver openings 82. The receiver openings 82 of the receiver 80 of each rear wheel 16 open axially inward toward the other rear wheel.

The stroller 10 further includes left and right brake rods 86, each slidably supported below the rear axle assembly 14 by an outer support member 88 and an inner support member 90 spaced laterally apart from each other. The inner support member 90 for each of the brake rods 86 has a tubular portion 92 receiving the outer axle 52 of the rear axle 28 therethrough and is fixedly attached to the rear axle and thereby prevented from rotating relative thereto by rivets 94.

The outer support member 88 for each of the brake rods 86 also has a tubular portion 96 receiving the outer tube 52 of the rear axle 28 therethrough and is fixedly attached to the rear axle and thereby prevented from rotating relative thereto by rivets 98. The tubular portion 96 of the outer support member 88 supporting the left brake rod is positioned laterally outward of and adjacent to the tubular connector portion 42 of the second coupler 40 at the left axle end. The tubular portion 96 of the outer support member 88 supporting the right brake rod is positioned laterally outward of and adjacent to the tubular connector portion 42 of the second coupler 40 at the right axle end.

Each of the outer and inner support members 88 and 90 for each brake rod 86 has a downwardly projecting guide portion 100 with a laterally extending guide hole slidably receiving the brake rod therein and permitting its free lateral movement toward and away from the adjacent one of the rear wheels 16, but restraining the brake rod against rotation about the tubular axle 28. The guide portions 100 hold the brake rods 86 at a position spaced below and away from the rear axle assembly 14 and parallel thereto. The guide portions 100 guide lateral movement of the brake rods to ensure their alignment with the receiving openings 82.

The left and right brake rods 86 are movable laterally outward, toward the corresponding left or right receiver 80 a sufficient distance to position an outward end 104 of the brake rod in one of the receiver openings 82 aligned therewith so as to selectively inhibit rotation of the rear wheel 16. Similarly, the left and right brake rods 86 are movable laterally inward, away from the corresponding left or right receiver 80 a sufficient distance to allow the outward end 104 of the brake rod to be withdrawn from the receiver openings 82 of the receiver to selectively allow rotation of the rear wheels 16. By simultaneously moving both of the left and right brake rods 86 laterally outward and into the ones of the receiver openings 82 with which aligned, a park brake is provided to prevent rotation of both rear wheels 16 and hence undesired movement of the stroller 10 when parked.

To control lateral movement of the brake rods 86 and serve as an actuator of the brake rods, a manually operable foot pedal 106 is provided. The foot pedal 106 has a tubular connector portion 108 rotatably receiving the outer axle tube 52 of the rear axle 28 therethrough to permit rotation of the foot pedal about the rear axle between a park brake engaged position and a park brake disengaged position. By pressing downward on an upper surface 110 of the foot pedal 106 with the user's foot, the foot pedal is rotated to the engaged position. The foot pedal 106 is returned to the disengaged position by applying an upward force on an underside 112 thereof with the user's foot.

The foot pedal connector portion 108 is rotatably mounted on the rear axle 28 between the tubular portions 92 of the inner support members 90 to restrain lateral movement of the foot pedal 106 on the rear axle. The brake rods 86 are each biased to move laterally inward toward the foot pedal 106 by a coil spring 114 mounted thereon inward of the outer support member 88 which supports the brake rod and outward of a spring retainer 116 fixedly mounted on each brake rod.

The foot pedal 106 includes a cam 118 slidably engaging an inward end of each of the brake rods 86 under the urging of the springs 114 mounted thereon, as the foot pedal is rotated between the disengaged and engaged positions. The cam 118 has a pair of flat surface end portions engaged by each of the left and right brake rods 86 when the foot pedal 106 is in the disengaged position. When the foot pedal 106 is in this position, the brake rods 86 are both moved inward under the urging of the springs 114 away from the receivers 80 with the outward ends 104 of the brake rods moved out of the receiver openings 82 to permit uninhibited rotation of the rear wheels 16.

The cam 118 also has a pair of sloped surface midportions which each diverge in the laterally outward direction from the other sloped surface midportion to progressively move both of the left and right brake rods 86 laterally outward toward the corresponding left and right receiver 80, respectively, as the foot pedal 106 is moved from the disengaged position toward the engaged position. The sloped midportions diverge sufficiently so that as the foot pedal 106 is rotated toward the engaged position, the outward ends 104 of the brake rods 86 will move laterally a sufficient amount to each enter into one of the receiver openings 82 with which aligned. The outward ends 104 each serve as a stop by engaging one or the other of the adjacent pair of ribs 84 which define the receiver opening into which the guide rod extends should the rear wheel 16 to which the receiver 80 is fixed begin to rotate as a result of the stroller 10 being left on an incline, being pushed, or otherwise.

The cam 118 also includes a flat surface end portion laterally spaced apart from the other flat surface end portion which is engaged by a corresponding one of the inward ends of the left and right brake rods 86 as the foot pedal 106 is moved into the engaged position. The flat end portions are oriented to produce substantially no lateral movement of the brake rods 86 as the foot pedal is moved through the final rotation to reach the engaged position. In that way, the laterally inward forces applied on the brake rods by the springs 114 will not cause a rotational force on the cam 118 which could cause the foot pedal 106 to unintentionally rotate back toward the disengaged position. This serves to lock the brake rods 86 in their laterally extended positions in the receiver openings 82.

It will be appreciated that, although a specific embodiment of the invention has been described herein for purposes of illustration, various modifications may be made without departing from the spirit and scope of the invention. Accordingly, the invention is not limited except as by the appended claims.

We claim:

1. An axle assembly for a baby stroller, comprising:

a rear wheel;

a stub axle having an outward end portion with said rear wheel rotatably mounted thereon and an inward end portion having a circular cross-section and a circumferential groove therein;

a tubular rear axle having a cylindrical, circumferential sidewall defining therewithin an axially extending cylindrical interior chamber with an outward facing opening sized to receive said stub axle inward end portion therethrough for positioning of said stub axle inward end portion coaxially within said interior chamber with said circumferential groove positioned axially inward of said interior chamber outward opening, said stub axle inward end portion and said interior chamber being sized in cross-section such that said stub axle inward end portion slidably fits within said interior chamber, said sidewall having an aperture therein positioned axially inward from said interior chamber outward opening and at a location to coincide with said circumferential groove when said stub axle inward end portion is within said interior chamber, said rear axle including an inner first uniform wall thickness tube forming said cylindrical interior chamber and an outer second uniform wall thickness tube which snugly receives said inner tube therein, said first and second tubes being fixedly attached together, with said first and second tubes each having a sidewall aperture aligned with the other to together form said sidewall aperture; and a lock member movably disposed in said sidewall aperture and selectively movable between an engagement position with said lock member extending into said interior chamber and into said circumferential groove of said stub axle inward end portion when positioned in said interior chamber to prevent axial withdrawal of said stub axle inward end portion from said interior chamber and a disengagement position with said lock member sufficiently clear of said circumferential groove of said stub axle inward end portion to permit said stub axle inward end portion to be axially inserted into and removed from said interior chamber.

2. The axle assembly of claim 1, further including a biasing member biasing said lock member to move into said engagement position and resiliently holding said lock member in said engagement position when said stub axle inward end portion is within said interior chamber, said biasing member being movable to permit said lock member to be selectively moved to said disengagement position.

3. An axle assembly for a baby stroller, comprising:

a rear wheel;

a stub axle having an outward end portion with said rear wheel rotatably mounted thereon and an inward end portion having a circumferential groove therein;

a rear axle having a circumferential sidewall defining therewithin an axially extending interior chamber with in outward facing opening sized to receive said stub axle inward end portion therethrough for positioning of said stub axle inward end portion coaxially within said interior chamber with said circumferential groove positioned axially inward of said interior chamber outward opening, said sidewall having an aperture therein positioned axially inward from said interior chamber outward opening and at a location to coincide with said circumferential groove when said stub axle inward end portion is within said interior chamber;

a pin movably disposed in said sidewall aperture and selectively movable between an engagement position with said pin extending into said interior chamber and into said circumferential groove of said stub axle inward end portion when positioned in said interior chamber to prevent axial withdrawal of said stub axle inward end portion from said interior chamber and a disengagement position with said pin sufficiently clear of said circumferential groove of said stub axle inward end portion to permit said stub axle inward end portion to be axially inserted into and removed from said interior chamber; and an elongated spring having first and second end portions, one of said end portions being on a forward facing side of said rear axle and the other being generally opposite thereof on a rearward facing side of said axle with a midportion extending between said first and second end spring portions, said pin being attached to said first end spring portion for movement herewith, said spring resiliently holding said pin in said engagement position and having sufficient flexibility to yield under a force manually applied by a user to said second end spring portion to move said first end spring portion and carry said pin therewith to said disengagement position.

4. The axle assembly of claim 3 for use with a baby stroller having a frame member located toward said sidewall aperture, wherein said spring is a flat strip spring having both said first and second end spring portions attached to the frame member.

5. The axle assembly of claim 3 wherein said spring midportion extends below said rear axle between said forward and rearward facing sides of said rear axle.

6. An axle assembly for a baby stroller having an upright frame member, comprising:

a rear wheel;

a stub axle having an outward end portion with said rear wheel rotatably mounted thereon and an inward end portion having a circumferential groove therein;

a rear axle attached to the upright frame member with the upright frame member extending upwardly from said rear axle, said rear axle having a circumferential sidewall defining therewithin an axially extending interior chamber with an outward facing opening sized to receive said stub axle inward end portion therethrough for positioning of said stub axle inward end portion coaxially within said interior chamber with said circumferential groove positioned axially inward of said interior chamber outward opening, said sidewall having an aperture therein positioned axially inward from said interior chamber outward opening and at a location to coincide with said circumferential groove when said stub axle inward end portion is within said interior chamber;

a pin movably disposed in said sidewall aperture and selectively movable between an engagement position with said pin extending into said interior chamber and into said circumferential groove of said stub axle inward end portion when positioned in said interior chamber to prevent axial withdrawal of said stub axle inward end portion from said interior chamber and a disengagement position with said pin sufficiently clear of said circumferential groove of said stub axle inward end portion to permit said stub axle inward end portion to be axially inserted into and removed from said interior chamber; and a spring having said pin attached thereto, said spring resiliently holding said pin in said engagement position and having sufficient flexibility to yield under a force manually applied by a user and carry said pin therewith to said disengagement position, said spring being a flat strip spring having a first end portion attached to a forward facing portion of the upright member and a second end portion attached to a rearward facing portion of the upright member with a midportion extending between said first and second end spring portions, said pin being attached to one of said first and second end spring portions for movement therewith and said spring midportion extending below said rear axle.

7. The axle assembly of claim 6 wherein said rear axle is a tube and said sidewall is cylindrical to form said interior chamber with a longitudinally extending, cylindrical shape, and said stub axle inward end portion has a circular cross-section sized to slidably fit within said cylindrical interior chamber.

8. The axle assembly of claim 7 wherein said circumferential groove of said stub axle inward end portion extends fully about the circumference of said stub axle inward end portion.

9. The axle assembly of claim 7 wherein said rear axle includes an inner first tube forming said cylindrical interior chamber and an outer second tube which snugly receives said inner tube therein, said first and second tubes being fixedly attached together, with said first and second tubes each having a sidewall aperture aligned with the other to together form said sidewall aperture with said pin movable therethrough.

10. The axle assembly of claim 6 wherein said stub axle inward end portion has an inwardly tapered end to engage said pin upon insertion of said stub axle inward end portion into said interior chamber and push said pin in an outwardly direction through said sidewall aperture sufficient to permit said stub axle inward end portion to be moved into said interior chamber with said circumferential groove aligned with said pin, whereupon said spring can move said pin inward into said circumferential groove.

11. A baby stroller, comprising:

left and right rear wheels;

left and right stub axles, each stub axle having an outward end portion with a corresponding one of said rear wheels rotatably mounted thereon and an inward end portion having a circumferential groove therein;

a transversely extending rear axle having a circumferential sidewall defining therewithin an axially extending interior chamber with left and right outward facing end openings, each sized to receive a corresponding one of said stub axle inward end portion therethrough for positioning of said stub axle inward end portion coaxially within said interior chamber with said circumferential groove positioned axially inward of said interior chamber outward opening, said sidewall having left and right apertures therein, each positioned axially inward from a corresponding one of said left and right interior chamber outward openings and at a location to coincide with said circumferential groove when said stub axle inward end portion is within said interior chamber;

left and right pins, each movably disposed in a corresponding one of said left and right sidewall apertures and selectively movable between an engagement position with said pin extending into said interior chamber and into said circumferential groove of said stub axle inward end portion when positioned in said interior chamber to prevent axial withdrawal of said stub axle inward end portion from said interior chamber and a disengagement position with said pin sufficiently clear of said circumferential groove of said stub axle inward end portion to permit said stub axle inward end portion to be axially inserted into and removed from said interior chamber; and elongated left and right springs, each having first and second end portions, one of said end portions being on a forward facing side of said rear axle toward a corresponding one of said left and right outward facing axle end openings and the other being generally opposite thereof on a rearward facing side of said rear axle with a midportion extending between said first and second end spring portions, each of said left and right springs having a corresponding one of said left and right pins attached to said first end spring portion thereof for movement therewith, each said spring resiliently holding said pin in said engagement position and having sufficient flexibility to yield under a force manually applied by a user to said second end spring portion to move said first end spring portion and carry said pin therewith to said disengagement position.

12. The baby stroller of claim 11, further including left and right frame members, each located toward a corresponding one of said left and right sidewall apertures, wherein each of said first and second springs is a flat strip spring having both said first and second end springs portions attached to a corresponding one of said left and right frame members.

13. The baby stroller of claim 11 wherein each of said spring midportions extends below said rear axle between said forward and rearward facing sides of said rear axle.

14. A baby stroller comprising:

left and right upright frame members left and right rear wheels;

left and right stub axles, each stub axle having an outward end portion with a corresponding one of said rear wheels rotatably mounted thereon and an inward end portion having a circumferential groove therein;

a transversely extending rear axle having left and right ends with said left and right upright frame members each being attached to said rear axle toward a corresponding one of said left and right rear axle ends and extending upwardly therefrom, said rear axle having a circumferential sidewall defining therewithin an axially extending interior chamber with left and right outward facing en openings at a corresponding one of said left and right rear axle ends, each end opening being sized to receive a corresponding one of said stub axle inward end portion therethrough for positioning of said stub axle inward end portion coaxially within said interior chamber with said circumferential groove positioned axially inward of said interior chamber outward opening, said sidewall having left and right apertures therein, each positioned axially inward from a corresponding one of said left and right interior chamber outward openings and at a location to coincide with said circumferential groove when said stub axle inward end portion is within said interior chamber;

left and right pins, each movably disposed in a corresponding one of said left and right sidewall apertures and selectively movable between an engagement position with said pin extending into said interior chamber and into said circumferential groove of said stub axle inward end portion when positioned in said interior chamber to prevent axial withdrawal of said stub axle inward end portion from said interior chamber and a disengagement position with said pin sufficiently clear of said circumferential groove of said stub axle inward end portion to permit said stub axle inward end portion to be axially inserted into and removed from said interior chamber; and left and right springs, each having a corresponding one of said left and right pins attached thereto, each said spring resiliently holding said pin in said engagement position and having sufficient flexibility to yield under a force manually applied by a user and carry said pin therewith to said disengagement position, said left and right springs each being a flat strip spring having a first end portion attached to a forward facing portion of a corresponding one of said left and right upright members and a second end portion attached to a rearward facing portion of that upright member with a midportion extending between said first and second end spring portions, said pin being attached to one of said first and second end spring portions for movement therewith and said spring midportion extending below said rear axle.

15. A baby stroller, comprising:

left and right rear wheels positionable at left and right spaced-apart wheel positions;

left and right stub axles, each stub axle having an outward end portion with a corresponding one of said rear wheels rotatably mounted thereon and an inward end portion having a circular cross-section and a circumferential groove therein;

a tubular transversely extending tubular rear axle extending fully between said left and right wheel positions and having a circumferential sidewall defining therewithin an axially extending, cylindrical interior chamber with left outward facing end openings, each sized to receive a corresponding one of said stub axle inward end portion therethrough for positioning of said stub axle inward end portion coaxially within said interior chamber with said circumferential groove positioned axially inward of said interior chamber outward opening, said stub axle inward end portion and said interior chamber being sized in cross-section such that said stub axle inward end portion slidably fits within said interior chamber, said sidewall having left and right apertures therein, each positioned axially inward from a corresponding one of said left and right interior chamber outward openings and at a location to coincide with said circumferential groove when said stub axle inward end portion is within said interior chamber, said rear axle including an inner first uniform wall thickness tube forming said cylindrical interior chamber and an outer second uniform wall thickness tube which snugly receives said inner tube therein, said first and second tubes being fixedly attached together, wih said first and second tubes each having left and right sidewall apertures aligned with a corresponding left and right sidewall aperture of the other to together form said left and right sidewall apertures; and left and right lock members, each movably disposed in a corresponding one of said left and right sidewall apertures and selectively movable between an engagement position with said lock member extending into said interior chamber and into said circumferential groove of said stub axle inward end portion when positioned in said interior chamber to prevent axial withdrawal of said stub axle inward end portion from said interior chamber and a disengagement position with said lock member sufficiently clear of said circumferential groove of said stub axle inward end portion to permit said stub axle inward end portion to be axially inserted into and removed from said interior chamber.

16. The baby stroller of claim 15 wherein said circumferential groove of said left and right stub axle inward end portions extends fully about the circumference of said sub axle inward end portion.

* * * * *

UNITED STATES PATENT AND TRADEMARK OFFICE
CERTIFICATE OF CORRECTION

PATENT NO. : 5,476,275
DATED : December 19, 1995
INVENTOR(S) : Philip A. Baechler, Matthew Eichenberger, William J. Setter and Bruce A Sully It is certified that error appears in the above identified patent and that said Letters Patent is hereby corrected as shown below:

In column 8, claim 1, line 30, following "cylindrical" please delete--,--.

In column 8, claim 1, line 31, following "extending" please insert --,--.

In column 9, claim 3, line 42, please delete "herewith" and insert therefor--therewith--.

In column 11, claim 12, line 50, please delete "springs" and insert therefor--spring--.

In column 11, claim 14, line 57, following "members" please insert --;--

In column 12, claim 14, line 4, please delete "en" and insert therefor--end--.

In column 12, claim 15, line 55, following "a", please insert--cylindrical--.

Signed and Sealed this

Twenty-first Day of May, 1996

*Attest:*

BRUCE LEHMAN

*Attesting Officer*   Commissioner of Patents and Trademarks

UNITED STATES PATENT AND TRADEMARK OFFICE
CERTIFICATE OF CORRECTION

PATENT NO. : 5,476,275
DATED : December 19, 1995
INVENTOR(S) : Philip A. Baechler, Matthew Eichenberger, William J. Setter, Bruce A. Sully It is certified that error appears in the above-identified patent and that said Letters Patent is hereby corrected as shown below:

```
Column 4, line 47, after "portion" delete "58a" and substitute
therefor --56a--.
```

Signed and Sealed this

Twenty-second Day of December, 1998

Attest:

BRUCE LEHMAN

*Attesting Officer*         *Commissioner of Patents and Trademarks*